United States Patent [19]
Balling

[11] Patent Number: 5,471,270
[45] Date of Patent: Nov. 28, 1995

[54] SPOOL DRIVE FOR FILM CARTRIDGE IN SINGLE-USE CAMERA

[75] Inventor: Edward N. Balling, Rochester, N.Y.

[73] Assignee: Eastman Kodak Company, Rochester, N.Y.

[21] Appl. No.: 214,714

[22] Filed: Mar. 16, 1994

[51] Int. Cl.⁶ .................................................. G03B 1/00
[52] U.S. Cl. ............................................ 354/212; 354/275
[58] Field of Search ..................................... 354/212, 275

[56] References Cited

U.S. PATENT DOCUMENTS

| 4,647,170 | 3/1987 | Stoneham | 354/275 |
| 5,408,288 | 4/1995 | Ogura et al. | |

Primary Examiner—Monroe H. Hayes
Attorney, Agent, or Firm—Roger A. Fields

[57] ABSTRACT

A single-use camera comprises a film cartridge including a cartridge shell and a film spool rotatably supported inside the shell with a cylindrical drive hub end axially protruding from the shell, and a manually rotatable film advance thumbwheel with an axially depending drive spindle engaging the drive hub end to rotate the spool. The cylindrical drive hub end has a pair of adjoining semi-cylindrical wall portions, one of which protrudes farther from the shell than the other. The drive spindle has a single semi-cylindrical wall portion matingly shaped to engage the cylindrical drive hub end at its pair of adjoining semi-cylindrical wall portions.

5 Claims, 2 Drawing Sheets

SPOOL DRIVE FOR FILM CARTRIDGE IN SINGLE-USE CAMERA

FIELD OF THE INVENTION

The invention relates generally to the field of photography, and in particular to single-use cameras. More specifically, the invention relates to a spool drive for a film cartridge in a single-use camera.

BACKGROUND OF THE INVENTION

Film and cameras that are all in one, commonly referred to as single-use or disposable cameras, have recently become well known. Typically, the single-use camera is a simple point-and-shoot type which comprises a plastic light-tight housing with a fixed-focus taking lens, a film metering mechanism, a single blade shutter, a frame (exposure) counter, possibly a built-in electronic flash unit, and a decorative cardboard casing containing the light-tight housing and having respective openings for the taking lens, a shutter release button, a manually rotatable film advance thumbwheel, a direct see-through viewfinder, the frame counter, and a flash emission window. At the manufacturer, the light-tight housing is loaded with a 12, 24, or 36 exposure 35 mm film cartridge and substantially the entire length of the unexposed filmstrip is factory prewound from the cartridge onto a spool in the housing or simply into a roll. Then, after the photographer takes a picture, he or she manually rotates the thumbwheel to rewind the exposed frame into the cartridge. The rewinding movement of the filmstrip the equivalent of slightly more than one frame width rotates a metering sprocket to decrement the frame counter to its next lower-numbered setting. Further details of this operation are disclosed in commonly assigned U.S. Pat. No. 5,235,366, issued Aug. 10, 1993, and in U.S. Pat. No. 4,890,130, issued Dec. 26, 1989. When the maximum number of exposures available on the filmstrip are exposed and the filmstrip is completely rewound into the cartridge, the camera is given to a photofinisher who first removes the cartridge with the filmstrip from the housing to develop the negatives and then forwards the camera to the manufacturer for recycling. The manufacturer, in turn, recycles the camera by loading it with another cartridge containing a fresh roll of film and repeating the foregoing prewinding process.

There is a need recognized in the industry to prevent unauthorized recycling of single-use cameras. In this connection, prior art Jap. (Kokai) patent application No. 4-226439, published Aug. 17, 1992, discloses a single-use camera that is modified at a drive spindle of the film advance thumbwheel to only be used with a special-mating film cartridge (as contrasted to a conventional type cartridge). More specifically, the special-mating film cartridge includes a film spool rotatably supported inside the shell of the cartridge with a cylindrical drive hub end protruding from the shell. The drive hub end is uniquely configured to only be engaged by the drive spindle in order to rotate the spool. Thus, unauthorized recycling of the camera using a conventional type cartridge is prevented.

Another prior art example is the commercially available Kodak "FunSaver 35" single-use camera. In this camera, the cylindrical drive hub end of the film spool for the film cartridge has a circular array of identical end teeth or castellations intended to be engaged by a matingly shaped drive spindle of the film advance thumbwheel. Thus, the camera cannot be used with a conventional type cartridge.

SUMMARY OF THE INVENTION

The invention provides a way to prevent unauthorized recycling of a single-use camera. Briefly summarized, according to one aspect of the invention there is provided a single-use camera comprising a film cartridge including a cartridge shell and a film spool rotatably supported inside the shell with a cylindrical drive hub end axially protruding from the shell, and a manually rotatable film advance thumbwheel with an axially depending drive spindle engaging the drive hub end to rotate the spool, which is characterized in that:

the cylindrical drive hub end has a pair of adjoining semi-cylindrical wall portions, one of which protrudes farther from the shell than the other; and the drive spindle has a single semi-cylindrical wall portion matingly shaped to engage the cylindrical drive hub end at its pair of adjoining semi-cylindrical wall portions.

According to another aspect of the invention there is provided a film cartridge comprising a cartridge shell and a film spool rotatably supported inside the shell with a cylindrical drive hub end protruding from the shell, which is characterized in that:

the cylindrical drive hub end has a pair of adjoining semi-cylindrical wall portions, one of which protrudes farther from the shell than the other to be engaged to rotate the film spool.

DETAILED DESCRIPTION OF THE INVENTION

The invention is disclosed as being embodied preferably in a single-use camera. Because the features of a single-use camera are generally known, the description which follows is directed in particular only to those elements forming part of or cooperating directly with the disclosed embodiment. It is to be understood, however, that other elements may take various forms known to a person of ordinary skill in the art.

Figure 3:
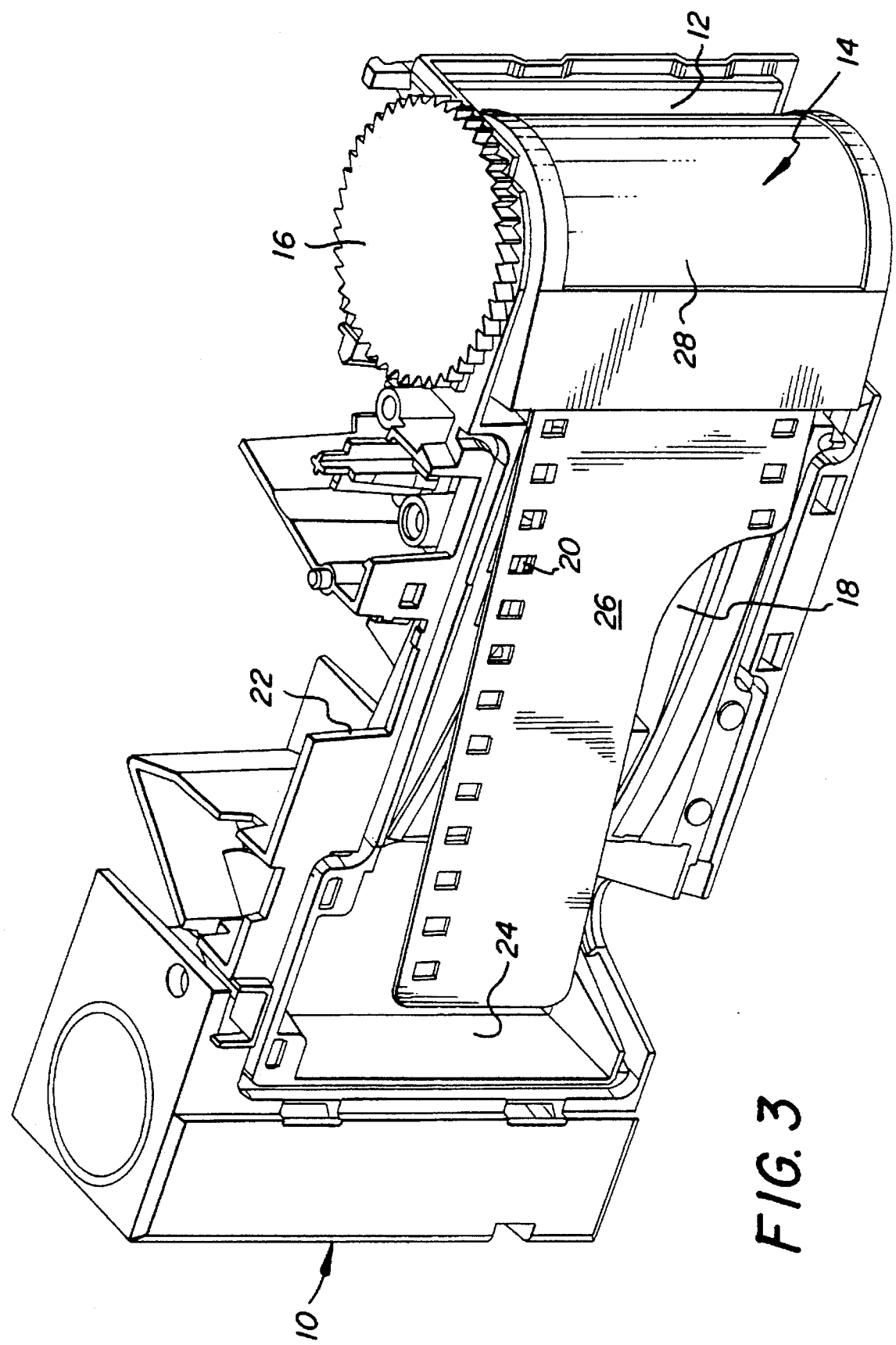
FIG. 3 is a perspective view of the main body section of a single-use camera including the film cartridge and the film advance thumbwheel.

Referring now to the drawings, FIG. 3 shows a main body section 10 of a single-use camera. The main body section 10 includes a chamber 12 for a 35 mm film cartridge 14, a manually rotatable film advance thumbwheel 16, a back frame or exposure opening 18, a film metering sprocket 20, a rear viewfinder window 22, and a chamber 24 for an unexposed film roll (not illustrated). At the manufacturer, the chamber 12 is loaded with the film cartridge 14 and substantially the entire length of an unexposed filmstrip 26 is factory prewound from the cartridge onto a spool (not illustrated) in the chamber 24 or simply into a roll in the chamber. Then, after the photographer takes a picture, he or she manually rotates the thumbwheel 16 to rewind the exposed frame into the cartridge 14. The rewinding movement of the filmstrip 26 the equivalent of slightly more than one frame width rotates the metering sprocket 20 to decrement a frame counter (not illustrated) to its next lower-numbered setting. Further details of this operation are disclosed in commonly assigned U.S. Pat. No. 5,235,366, issued Aug. 10, 1993, and in U.S. Pat. No. 4,890,130, issued Dec. 26, 1989. When the maximum number of exposures available on the filmstrip 26 are exposed and the filmstrip is completely rewound into the cartridge 14, the single-use camera is given to a photofinisher who first removes the cartridge with the filmstrip from the chamber 12 to develop the negatives and then forwards the camera to the manufacturer for recycling. The manufacturer, in turn, recycles the camera by loading it with another cartridge containing a fresh roll of film and repeating the foregoing prewinding process.

Figure 2:
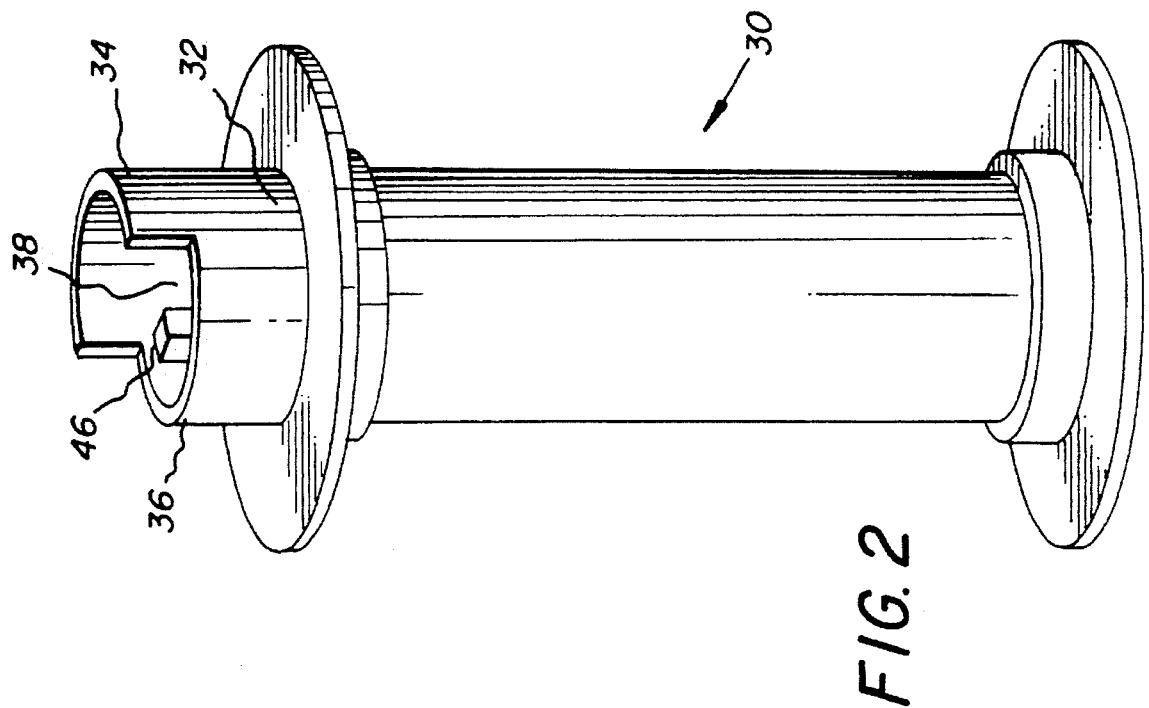
FIG. 2 is a perspective view of the film spool.

The film cartridge 14 comprises a light-tight cartridge shell or housing 28 and a film spool 30 rotatably supported inside the shell with a cylindrical drive hub end 32 of the spool protruding from a top end of the shell. As shown in FIG. 2, the cylindrical drive hub end 32 has a pair of adjoining semi-cylindrical wall portions 34 and 36, one of which protrudes farther from the top end of the shell 28 than the other. The pair of adjoining semi-cylindrical wall portions 34 and 36 together define (enclose) a hollow or cavity 38 in the cylindrical drive hub end 32.

Figure 1:
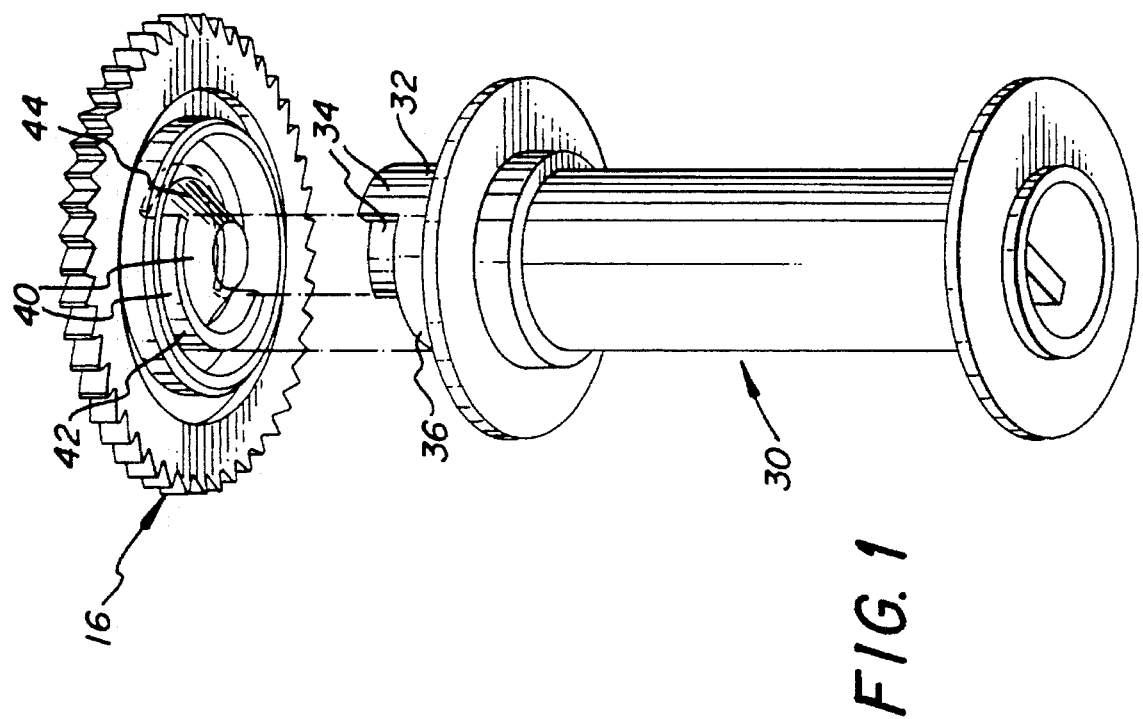
FIG. 1 is a perspective view of a film spool for a 35 mm film cartridge and a film advance thumbwheel with a drive spindle matingly shaped to engage the drive spindle, according to a preferred embodiment of the invention.

The film advance thumbwheel 16 includes an axially depending drive spindle 40 that engages the drive hub end 32, as shown in FIG. 1, to rotate the film spool 30. More specifically, the drive spindle 40 has a single semi-cylindrical wall portion 42 matingly shaped to engage the drive hub end 32 at its pair of adjoining semi-cylindrical wall portions 34 and 36 by aligning with the semi-cylindrical wall portion 36. A conically-shaped center projecting portion 44 of the drive spindle 40 extends into the hollow 38 in the drive hub end 32 to ensure alignment of the semi-cylindrical wall portion 42 with the semi-cylindrical wall portion 36.

At least one of the pair of adjoining semi-cylindrical wall portions 34 and 36 optionally can include an internal spline or rib 46 that protrudes into the hollow 38, as shown in FIG. 1, to permit the film spool 30 to be engaged in a conventional manner to rotate the spool.

The invention has been described with reference to a preferred embodiment. However, it will be appreciated that variations and modifications can be effected by a person of ordinary skill in the art without departing from the scope of the invention.

PARTS LIST 10. main body section
12. chamber
14. film cartridge
16. film advance thumbwheel
18. back frame opening
20. film metering sprocket
22. rear viewfinder window
24. chamber
26. unexposed filmstrip
28. cartridge shell
30. film spool
32. cylindrical drive hub end
34. cylindrical wall portion
36. cylindrical wall portion
38. hollow
40. drive spindle
42. semi-cylindrical wall portion
20 44. center projecting portion
46. internal spline

I claim:

1. A film cartridge comprising a cartridge shell and a film spool rotatably supported inside said shell with a cylindrical drive hub end protruding from said shell, is characterized in that:

said cylindrical drive hub end has a pair of adjoining semi-cylindrical wall portions, one of which protrudes farther from said shell than the other to be engaged to rotate said film spool.

2. A film cartridge as recited in claim 1, wherein said pair of adjoining semi-cylindrical wall portions together define a hollow in said cylindrical drive hub end.

3. A film cartridge as recited in claim 2, wherein at least one of said pair of adjoining semi-cylindrical wall portions includes an internal spline that protrudes into said hollow to be engaged to rotate said film spool.

4. A single-use camera comprising a film cartridge including a cartridge shell and a film spool rotatably supported inside said shell with a cylindrical drive hub end axially protruding from said shell, and a manually rotatable film advance thumbwheel with an axially depending drive spindle engaging said drive hub end to rotate said spool, is characterized in that:

said cylindrical drive hub end has a pair of adjoining semi-cylindrical wall portions, one of which protrudes farther from said shell than the other; and said drive spindle has a single semi-cylindrical wall portion matingly shaped to engage said cylindrical drive hub end at its pair of adjoining semi-cylindrical wall portions.

5. A single-use camera as recited in claim 4, wherein said pair of adjoining semi-cylindrical wall portions together define a hollow in said cylindrical drive hub end, and said drive spindle includes a center projecting portion which extends into said hollow.

* * * * *